April 28, 1931.  J. A. RAMSEY  1,802,573
PISTON RING CONSTRUCTION
Filed Aug. 23, 1930
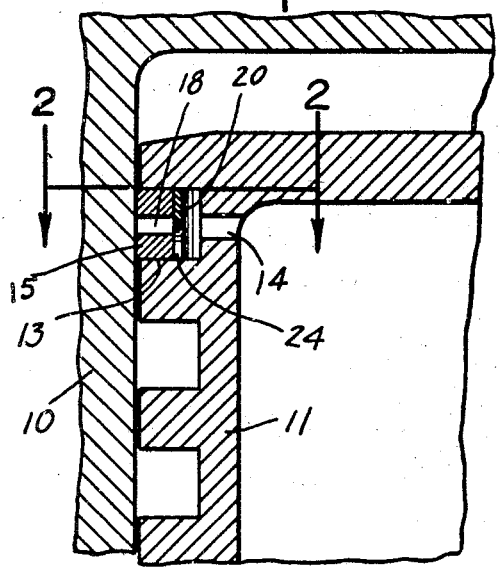
FIG. 1
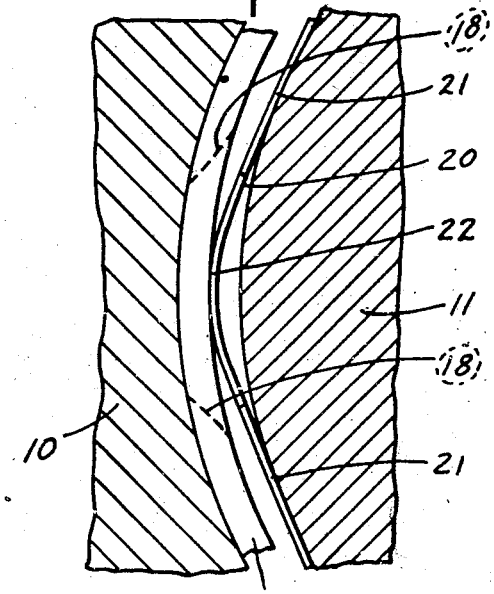
FIG. 2
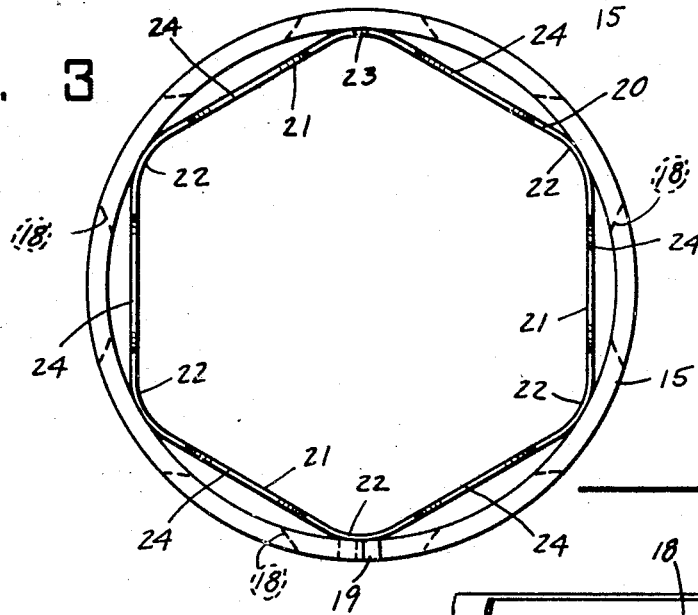
FIG. 3
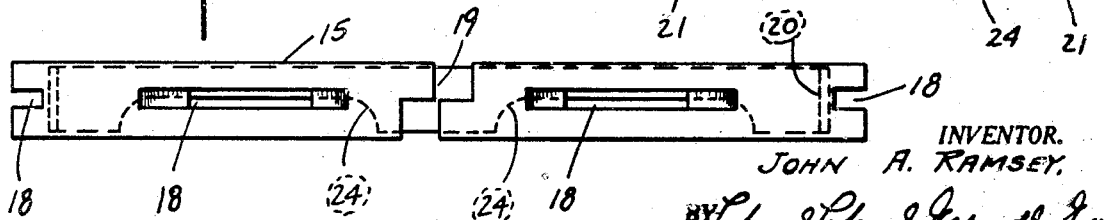
FIG. 4
FIG. 5
INVENTOR.
JOHN A. RAMSEY,
ATTORNEYS.

Patented Apr. 28, 1931

1,802,573

UNITED STATES PATENT OFFICE

JOHN A. RAMSEY, OF CLAYTON, MISSOURI, ASSIGNOR TO RAMSEY ACCESSORIES MANUFACTURING CORPORATION, OF ST. LOUIS, MISSOURI, A CORPORATION

PISTON-RING CONSTRUCTION

Application filed August 23, 1930. Serial No. 477,254.

This invention relates to a piston ring construction and particularly to that type of piston ring employed in connection with pistons as an oil scraper adapted to prevent oil leakage between the piston and cylinder wall, and cause the oil forced through the ring to be returned through the piston.

The object of the invention is to provide a structure of this character employing an outer ring and a flat polygonal inner ring, the outer ring adapted to engage and closely fit against the cylinder wall while the inner ring exerts an outward pressure thereon for resiliently maintaining it in sealing engagement therewith.

The substantially polygonal inner ring, formed of flat spring metal and positioned intermediate the outer ring and the piston for exerting an outward pressure on the former, is provided with suitable elongated openings in the lower edge thereof which are positioned to register with the slots through the outer ring for permitting the oil escaping through said slots to freely pass through said openings in the inner ring and return through the oil holes in the piston.

The particular feature of this invention resides in the provision of elongated openings or notches formed in or adjacent to the bottom edge of the inner ring and extending substantially throughout the length of the side walls thereof, each end terminating just short of the curved portion joining the side walls.

Wherein oil vents in the inner ring are in the form of a plurality of notches approximately the diameter of the oil vent holes formed in the piston, they often fail to function. Inasmuch as a substantial portion of the inner ring lies flat against the inner wall of the piston ring groove, the oil ducts therein will be closed against oil passage unless it so happens that the inner ring takes a position wherein the notches register with the oil ducts. Since the notches are of substantially the same diameter as the oil ducts, more often than not, they do not register, whereby the notches in the inner ring fail in their purpose. As distinguished therefrom, the provision of the elongated notches or openings overcomes this difficulty inasmuch as all that portion of the inner ring which engages the inner wall of the piston ring groove over the oil ducts is open to freely permit passage of oil therethrough.

The full nature of the invention will be more clearly understood from the accompanying drawings and the following description and claims.

Fig. 1 is a central vertical section through a piston showing it mounted in a cylinder wall with the ring construction positioned therein. Fig. 2 is a section taken on the line 2—2 of Fig. 1. Fig. 3 is a plan view of the ring construction dismounted from the piston. Fig. 4 is a side elevation of a portion of the ring construction from the inner side thereof. Fig. 5 is the same as Fig. 4 showing a side view of the ring construction from the outer side thereof.

As shown in the drawings, there is a cylinder wall 10 in which the piston 11 is reciprocably mounted, said piston being provided with the usual ring grooves 13 for receiving the piston rings in the usual manner. Said ring grooves are connected by a plurality of oil ducts 14 with the inner surface of the piston for permitting the return of oil therethrough.

The ring construction as illustrated herein, comprises an outer ring 15 adapted to engage the cylinder wall and seal the same against the passage of oil. The ring is circumferentially slotted to provide a plurality of spaced oil passages 18 extending through the ring from the outer to the inner walls thereof intermediate the upper and lower surfaces. The ring is split and provided with staggered ends as indicated at 19 in the usual manner.

The inner ring 20 is polygonal in general conformation, and as shown herein, is six sided, having a plurality of straight sides indicated at 21, connected together with curved portions indicated at 22. Said inner ring is formed of flat spring sheet metal having a width substantially the same as the width of the outer ring and split intermediate one of the curved portions 22 as indicated at 23.

Said inner ring is adapted to lie within the outer ring intermediate said outer ring and the wall of the ring groove of the piston so as to exert an outward yielding pressure under spring tension against the outer ring for forcing it into sealing contact with the cylinder wall.

Said inner ring is adapted to lie within the outer ring intermediate said outer ring and the wall of the ring groove of the piston so as to exert an outward yielding pressure under spring tension against the outer ring for forcing it into sealing contact with the cylinder wall.

In order to permit the free passage of the oil past the inner ring and through the oil ducts 14 in the piston, regardless of the position of the inner ring with respect thereto, there are provided a plurality of elongated notches or openings 24, one in each of the polygonal sides 21 of the inner ring and adjacent the bottom edge thereof. These notches extend substantially throughout the length of the sides 21, terminating just short of the curved portions 22. Said elongated notches or openings extend upwardly a sufficient distance to register with the oil passages 18 in the outer ring. Thus, when the ring construction is mounted in the piston, the outer ring is yieldingly forced into sealing engagement with the cylinder wall so as to prevent passage of oil therepast, while permitting excess oil to pass through the oil slots 18 therein and the elongated notches or openings 24 in the inner ring to be drained through the oil ducts 14 in the piston.

As the outer piston ring is dead,—that is, formed without spring tension as in the usual piston ring, a predetermined tension may be created thereon by the spring tension of the inner ring, which is impervious to depreciation from heat or friction. It is possible in forming the inner ring of spring sheet metal, to obtain a predetermined spring tension therein so as to cause it to properly co-act with the outer dead ring. This inner ring, as will be noted, will center the piston and act as a shock absorber, in the natural tendency of the piston to strike the wall, thus preventing piston slap noise.

It will be noted that, regardless of the relative position of the inner ring with respect to the piston, the oil ducts can not be closed thereby. This is due to the fact that the elongated openings extend over the entire length of the polygonal sides 21 of the inner ring which are in engagement with the inner wall of the piston ring groove, while that portion of the inner ring intermediate the elongated openings is spaced from the inner wall of the piston ring groove so as not to interfere with the passage of oil through the oil ducts registering therewith.

The invention claimed is:

1. As a new article of manufacture, an expander for piston rings comprising a ribbon of spring metal of general polygonal shape, said expander having sides of substantially plane surfaces and arcuate portions connecting adjacent sides, some of said sides having corresponding edges recessed throughout substantially their entire length, whereby when said expander is placed in a piston ring groove having drainage ports therein said ports will not be closed by said expander.

2. As a new article of manufacture, an expander for piston rings comprising a ribbon of spring metal of general polygonal shape, said expander having sides of substantially plane surfaces and arcuate portions connecting adjacent sides, some of said sides having corresponding edges recessed throughout substantially their entire length and substantially one-half their width, whereby when said expander is placed in a piston ring groove having drainage ports therein said ports will not be closed by said expander.

3. As a new article of manufacture, an expander for piston rings comprising a ribbon of spring metal of general polygonal shape, said expander having sides of substantially plane surfaces and arcuate portions connecting adjacent sides, said arcuate portions being of substantially greater width than the sides of the expander, and all points in one edge of the expander lying in the same plane.

In witness whereof, I have hereunto affixed my signature.

JOHN A. RAMSEY.